(12) United States Patent
Tang et al.

(10) Patent No.: US 11,835,804 B2
(45) Date of Patent: Dec. 5, 2023

(54) PEEP-PROOF FILM, BACKLIGHT SOURCE AND DISPLAY DEVICE

(71) Applicants: Hefei BOE Optoelectronics Technology Co., Ltd., Anhui (CN); BOE TECHNOLOGY GROUP CO., LTD., Beijing (CN)

(72) Inventors: Hai Tang, Beijing (CN); Liang Gao, Beijing (CN); Xiaolin Geng, Beijing (CN); Bing Zhang, Beijing (CN)

(73) Assignees: Hefei BOE Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 171 days.

(21) Appl. No.: 17/195,779

(22) Filed: Mar. 9, 2021

(65) Prior Publication Data

US 2021/0278712 A1    Sep. 9, 2021

(30) Foreign Application Priority Data

Mar. 9, 2020  (CN) .......................... 202010156961.7

(51) Int. Cl.
| | | |
|---|---|---|
| G02F 1/13 | (2006.01) |
| G02F 1/16757 | (2019.01) |
| G02F 1/1676 | (2019.01) |
| G02F 1/13357 | (2006.01) |
| G02F 1/1343 | (2006.01) |
| G02F 1/167 | (2019.01) |
| G02F 1/1677 | (2019.01) |

(52) U.S. Cl.
CPC ........ *G02F 1/1323* (2013.01); *G02F 1/13439* (2013.01); *G02F 1/133606* (2013.01); *G02F 1/167* (2013.01); *G02F 1/1676* (2019.01); *G02F 1/1677* (2019.01); *G02F 1/16757* (2019.01)

(58) Field of Classification Search
None
See application file for complete search history.

(56) References Cited

FOREIGN PATENT DOCUMENTS

WO    2020-116008    * 11/2020

* cited by examiner

*Primary Examiner* — Ashok Patel
(74) *Attorney, Agent, or Firm* — HOUTTEMAN LAW LLC (57) ABSTRACT

The present disclosure provides a peep-proof film, the peep-proof film includes a light-transmitting film body, an electrophoretic liquid, a first electrode pattern and a second electrode pattern, the film body includes a light incident surface and a light exit surface which are opposite to each other, the first electrode pattern and the second electrode pattern are spaced in a thickness direction of the peep-proof film, the film body has a plurality of receiving cavities thereinside, the electrophoretic liquid is in the receiving cavities, the electrophoretic liquid is located between the first electrode pattern and the second electrode pattern and includes a dispersion medium and electrophoretic particles, and a refractive index of the dispersion medium is less than that of the film body. The present disclosure further provides a backlight source and a display device.

18 Claims, 6 Drawing Sheets

(--Prior Art--)

Fig. 15

(--Prior Art--)

PEEP-PROOF FILM, BACKLIGHT SOURCE AND DISPLAY DEVICE

CROSS REFERENCE TO RELATED APPLICATIONS

The present application claims priority from Chinese patent application No. 202010156961.7 filed at the Chinese Intellectual Property Office on Mar. 9, 2020, the disclosure of which is incorporated herein by reference in its entirety.

TECHNICAL FIELD

The present disclosure relates to the field of display technology, and in particular, to a peep-proof film, a backlight source and a display device.

BACKGROUND

There is a display device having a peep-proof function on the market at present, and specifically, the display device has two modes: one is a sharing mode in which a viewing angle of the display device is relative large; and the other is a peep-proof mode in which the viewing angle of the display device is relative small. When the display device is in the peep-proof mode, a viewer facing a display surface of the display device is allowed to see a picture; when the display device is in the sharing mode, the viewer slightly deviated from the display surface of the display device is also allowed to see the picture.

DISCLOSURE OF INVENTION

Embodiments of the present disclosure provided a peep-proof film, a backlight source and a display device.

An embodiment of the present disclosure provides a peep-proof film, including: a light-transmitting film body, an electrophoretic liquid, a first electrode pattern and a second electrode pattern, the film body includes a light incident surface and a light exit surface which are opposite to each other, the first electrode pattern and the second electrode pattern are spaced from each other in a thickness direction of the peep-proof film, the film body has a plurality of receiving cavities thereinside, the electrophoretic liquid is in the receiving cavities, the electrophoretic liquid is located between the first electrode pattern and the second electrode pattern, and includes a dispersion medium and electrophoretic particles, and a refractive index of the dispersion medium is less than that of the film body.

In some implementations, the light exit surface of the film body includes a plurality of planar connecting portions and a plurality of curved surface protrusions, each curved surface protrusion is located between two adjacent receiving cavities, and adjacent curved surface protrusions are connected by the planar connecting portion.

In some implementations, dimensions of the peep-proof film satisfy the following relationship:

$$\arctan\left(\frac{d1}{2h1}\right) \leq \sigma,$$

where d1 is a distance between opposite side surfaces of two adjacent receiving cavities;
h1 is a distance between a top surface of the receiving cavity and the light incident surface;

σ is a maximum divergence angle of light irradiated on the curved surface protrusions from the light incident side of the peep-proof film.

In some implementations, a refractive index of the dispersion medium and the refractive index of the film body satisfy the following relationship:

$$\arcsin\left(\frac{n4}{n1}\right) \geq \frac{\pi}{2} - \delta,$$

where n4 is the refractive index of the dispersion medium;
n1 is the refractive index of the film body;
δ is a maximum divergence angle of light reflected at a side wall of the receiving cavity.

In some implementations, the first electrode pattern includes a plurality of first electrodes, and each receiving cavity is provided therein with at least one of the first electrodes.

In some implementations, the film body includes a first substrate and a second substrate, the first substrate and the second substrate are attached together, a surface of the second substrate facing away from the first substrate is the light incident surface, and a surface of the first substrate facing away from the second substrate is the light exit surface.

In some implementations, the first electrode is disposed on a top surface of the receiving cavity with a space between each edge of the first electrode and a side wall of the receiving cavity adjacent to the edge, where the top surface of the receiving cavity is a surface of the receiving cavity facing the light exit surface.

In some implementations, the receiving cavity is formed in the first substrate.

In some implementations, the receiving cavity includes a first receiving groove formed in the first substrate and a second receiving groove formed in the second substrate.

In some implementations, the first electrode pattern is an entire plate-shaped electrode, the first electrode pattern is located between the first substrate and the second substrate, and the receiving cavities are located in the second substrate.

In some implementations, the second electrode pattern is an entire plate-shaped electrode and is made of a transparent conductive material, and the second electrode pattern is located on a light incident side of the light incident surface.

In some implementations, the peep-proof film further includes at least one reflective layer, where the reflective layer is disposed on a bottom surface of at least one of the receiving cavities, and where the bottom surface of the receiving cavity is a surface of the receiving cavity facing the light incident surface.

In some implementations, the receiving cavities are parallel to each other and are spaced apart from each other.

In some implementations, the receiving cavities are intersected with each other to divide the peep-proof film into a plurality of light transmitting parts.

An embodiment of the present disclosure provides a backlight source, which includes a light emitting panel, where the backlight source further includes the peep-proof film as described above, and the light incident surface of the peep-proof film is opposite to a light emitting surface of the light emitting panel.

In some implementations, the backlight source further includes a reflective polarizer located on a light exit side of the peep-proof film.

An embodiment of the present disclosure provides a display device, including a display panel and the backlight source as described above, and the backlight source is located on a backlight side of the display device.

DRAWINGS

The accompanying drawings, which are included to provide a further understanding of the present disclosure and are incorporated in and constitute a part of this specification, are used to explain the present disclosure together with the specific embodiments, but do not constitute a limitation of the present disclosure. In the drawings.

DETAILED DESCRIPTION

The specific embodiments of the present disclosure are described in detail below in combination with the accompanying drawings. It should be understood that the specific embodiments described herein are only used to illustrate and explain the present disclosure and are not used to limit the present disclosure.

The display device having the peep-proof function in the related art has low brightness, thereby increasing power consumption of the display device. Therefore, how to reduce the power consumption of the display device is a technical problem to be solved urgently in the field.

Figure 1:
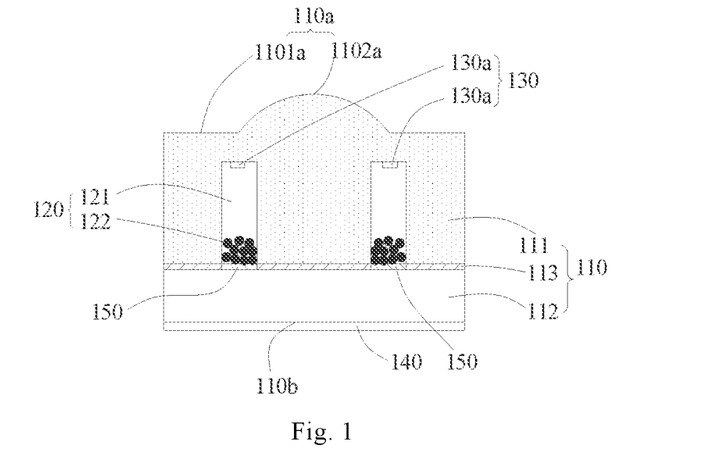
FIG. 1 is a schematic diagram of a portion of a peep-proof film according to an embodiment of the present disclosure.
Figure 2:
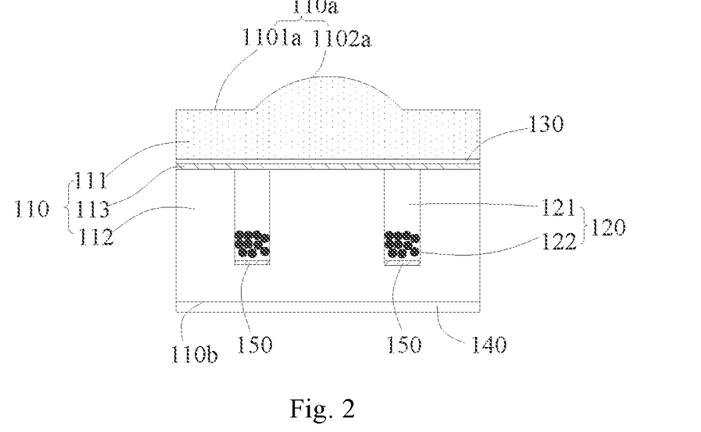
FIG. 2 is a schematic diagram of a portion of a peep-proof film according to an embodiment of the present disclosure.
Figure 3:
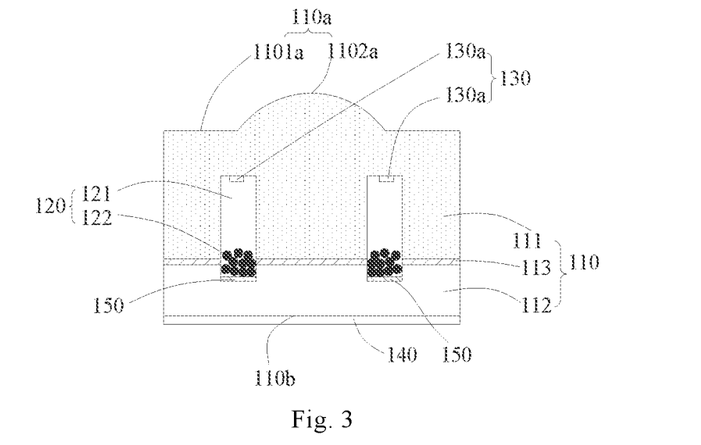
FIG. 3 is a schematic diagram of a portion of a peep-proof film according to an embodiment of the present disclosure.

An embodiment of the present disclosure provides a peep-proof film, as shown in FIGS. 1 to 3, which includes a light-transmitting film body 110, an electrophoretic liquid 120, a first electrode pattern 130, and a second electrode pattern 140. The film body 110 includes a light exit surface 110a and a light incident surface 110b, the first electrode pattern 130 and the second electrode pattern 140 are arranged at an interval along a thickness direction (i.e., a vertical direction in FIGS. 1 to 3) of the peep-proof film, a plurality of receiving cavities are formed inside the film body 110, the electrophoretic liquid 120 is disposed in the receiving cavities, and the electrophoretic liquid is located between the first electrode pattern 130 and the second electrode pattern 140.

The electrophoretic liquid 120 includes a dispersion medium 121 and electrophoretic particles 122, where the dispersion medium 121 is a transparent medium and the electrophoretic particles 122 are made of a light absorbing material (e.g., a black material). A refractive index n4 of the dispersion medium 121 is smaller than a refractive index of the film body 110. Any two adjacent receiving cavities with a same extending direction have a preset distance therebetween. The preset distance may be determined according to specific needs.

It is noted that, when the peep-proof film is used in cooperation with a display panel, the peep-proof film and the display panel are stacked.

FIG. 1 is a schematic diagram of a peep-proof unit of the peep-proof film, and FIG. 1 shows a schematic diagram of the peep-proof film in a sharing mode. In this case, a first voltage is applied to the first electrode pattern 130, a second voltage is applied to the second electrode pattern 140, an electric field is formed between the first electrode pattern 130 and the second electrode pattern 140, and the electrophoretic particles 122 in the electrophoretic liquid 120 are accumulated at bottoms of the receiving cavities under the action of the electric field, so that the light incident from the light incident surface of the peep-proof film is not obstructed from being emitted.

Figure 4:
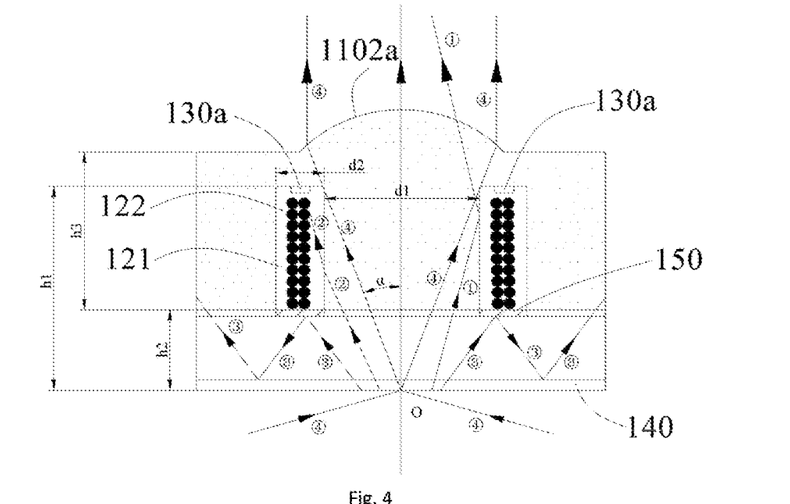
FIG. 4 illustrates an operation principle of a peep-proof film according to an embodiment of the present disclosure.

FIG. 4 is a schematic diagram of the peep-proof unit shown in FIG. 1 in a peep-proof mode. In this case, the first voltage is not applied to the first electrode pattern 130 and the second voltage is not applied to the second electrode pattern 140, no electric field is formed between the first electrode pattern 130 and the second electrode pattern 140, the electrophoretic particles 122 are dispersed in the electrophoretic liquid 121 without being controlled by an electric field, to form a barrier wall between the first electrode pattern 130 and the second electrode pattern 140.

Since the refractive index n4 of the dispersion medium 121 is smaller than the refractive index of the film body 110, the dispersion medium 121 is an optically thinner medium relative to the film body 110, and therefore, part of light (which has an incident angle greater than a critical angle, and is denoted by a light ray 0 in FIG. 4) is totally reflected when being transmitted from the film body 110 being an optically denser medium to an interface between the film body 110 and the dispersion medium 121 being the optically thinner medium, and finally exits from the light exit surface 110b, rather than being continuously transmitted into the dispersion medium 121 until being absorbed by the electrophoretic particles 122. Therefore, when the peep-proof film provided by the present disclosure is used for realizing the peep-proof mode of the display panel, the light output is large, and the display brightness of the display device including the peep-proof film in the peep-proof mode can be ensured.

The principle that the peep-proof film provided by the present disclosure can improve the brightness of the display device is described in detail below with reference to FIGS. 5 and 6.

Figure 5:
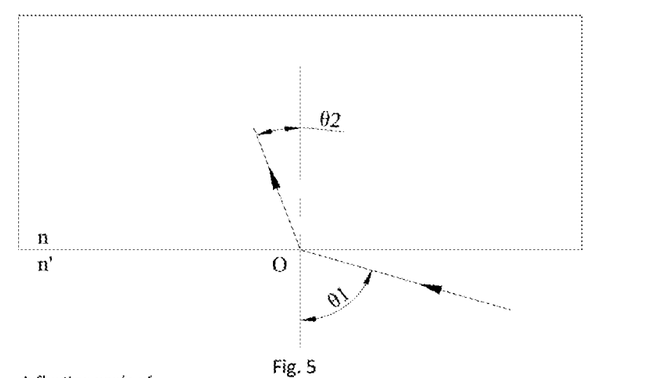
FIG. 5 illustrates a principle diagram of refraction of light.
Figure 6:
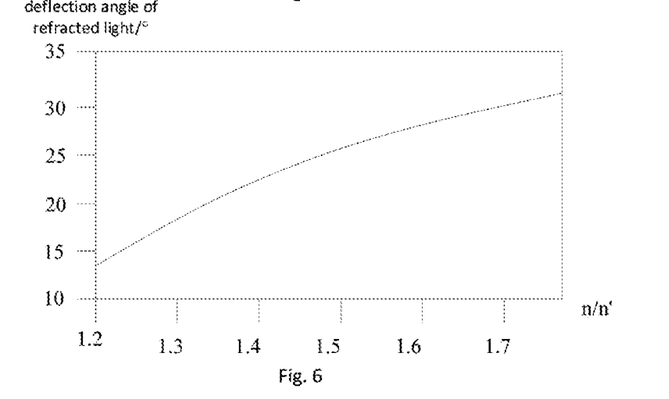
FIG. 6 illustrates a curve of a deflection of light entering an optically denser medium from an optically thinner medium.

As shown in FIG. 5, when light enters the optically denser medium from the optically thinner medium, the light will be deflected to the vertical direction (an incident angle is $\theta_1$, an exit angle is $\theta_2$, where $\theta_1 > \theta_2$), the light deflection rule is as shown in FIG. 6, and when light is incident at a same angle, the larger the refractive index of the optically denser medium is, the larger the light deflection angle is, i.e., the larger a convergence degree is, the light deflection rule can be described by formula (1) below:

$$\Delta\theta = \theta_1 - \arcsin\left(\frac{n'}{n}\sin\theta_1\right), \quad (1)$$

where n' is the refractive index of the optically thinner medium;

n is the refractive index of the optically denser medium;

$\Delta\theta$ is the deflection angle of the incident light, and $\Delta\theta = \theta_1 - \theta_2$.

As can be seen from the formula (1), the larger the ratio of n' to n is, the larger the light deflection angle $\Delta\theta$ is.

Assuming that the incident light at an O-point is Lambertian, the luminous flux can be expressed by the formula (2) below, where $0° \leq \theta \leq 90°$.

$$\Phi = LdS\cos\theta \int_0^{2\pi} d\psi \int_0^{\theta} \sin\theta d\theta = \pi LdS\sin^2\theta, \quad (2)$$

where $\Phi$ is the luminous flux;

dS is a Lambertian microfacet;

L is the brightness of the incident light;

$\theta$ is the incident angle of the incident light.

The smaller the exit angle $\theta_2$ of the refracted light is, the more concentrated the light is, and the more likely the light would exit. Conversely, the larger $\theta_2$ is, the more easily the light is absorbed by the electrophoretic particles, and the light efficiency is reduced. If a critical angle is $\lambda$, when the exit angle $\theta_2$ of the refracted light satisfies $\theta_2 \leq \lambda$, the light would not absorbed by the electrophoretic particles with high probability and can be emitted from the peep-proof film, and the exit angle of the light meets the peep-proof requirement. The luminous flux of the light can be represented by $\Phi 1$ in formula (3). It can be seen from the formula (3) that the larger the ratio of n2 to n0 is, the larger an effective luminous flux is, and the higher a luminous efficiency is, where n2 is the refractive index of the optically denser medium (the second substrate 112 in the present disclosure), and n0 is the refractive index of air.

$$\Phi 1 = \pi LdS\left(\frac{n2}{n0}\sin\lambda\right)^2. \quad (3)$$

The process that the light penetrates through the first substrate to exit the peep-proof film is that the light enters the optically thinner medium from the optically denser medium, and the light would be emitted in a diverging mode according to the refraction theorem, namely, a direction of the light would incline to a horizontal direction. In order to solve this problem, each light exit surface of an electrophoretic cell in the embodiment is designed with a light convergence curved surface, as shown in FIG. 4, a protrusion of the curved surface (i.e., curved surface protrusion) is located right above centers of two receiving cavities, the light-incident point O is a focal point of a convex lens formed by a portion corresponding to the curved surface protrusion, and the refracted light from the light-incident point O would be converted into collimated light when transmitting onto the curved surface. Under the condition of meeting the same peep-proof specification, by providing the curved surface protrusion, a distance between two adjacent receiving cavities can be increased, or a depth of the receiving cavities can be reduced, which can effectively reduce a processing difficulty and a cost of the receiving cavities, improve the light efficiency and reduce a thickness of a module.

Assuming that a distance from the top of the receiving cavity to the light incident surface is h1, a thickness of the second substrate is h2, and a thickness of the first substrate is h3, and a focal length of the curved surface is f=h2+h3.

Assuming that a distance between side walls of two adjacent receiving cavities is d1, and a width of the receiving cavity is d2, then a period of the peep-proof unit is l=d1+d2.

Assuming that a maximum angle of light transmitted directly to the light convergence curved surface is $\alpha$, there must be a critical angle $\sigma$ (i.e., a maximum divergence angle of light transmitted from the light incident side of the peep-proof film onto the curved surface protrusions, which usually satisfies $20° < \sigma < 60°$, as an alternative implementation, $\sigma$ may be equivalent to $30°$) to satisfy peep-proof requirements for exiting light, such that $\alpha \leq \sigma$, and $\sigma$ and a size of the peep-proof film may be expressed by a formula (4):

$$\arctan\left(\frac{d1}{2h1}\right) \leq \sigma. \quad (4)$$

Figure 7:
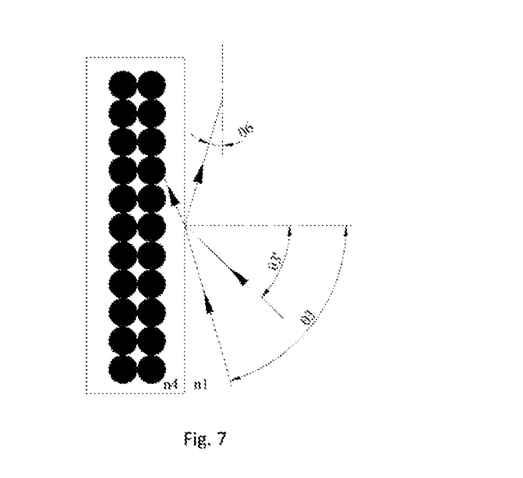
FIG. 7 illustrates a schematic light path in a peep-proof mode according to an embodiment of the present disclosure.

Assuming that the refractive index of the dispersion medium is n4 and the refractive index of the first substrate is n1, in the present disclosure, n4<n1, so that the light can achieve two functions, as shown in FIG. 7, when the incident angle $\theta 3'$ of the light is smaller than a total reflection angle (the light is light with a large viewing angle), the light would enter the electrophoretic liquid and is absorbed by the electrophoretic particles, and when the incident angle $\theta 3$ is larger than the total reflection angle, the light is totally reflected on a surface of an electrophoretic slot (receiving cavity) and exits the peep-proof film. Therefore, the refraction indexes of the substrate and the electrophoretic liquid may be properly designed, so that the total reflection characteristic can be utilized to select light with a specific viewing angle, and a phenomenon that light with a narrow viewing angle is absorbed by the electrophoretic particles to cause the light efficiency is reduced is avoided.

The law of light can be described by a formula (5):

$$\theta 3' < \arcsin\left(\frac{n4}{n1}\right) \leq \theta 3. \quad (5)$$

In terms of peep-proof requirements, assuming that an angle between the total reflection light and the vertical direction needs to satisfy a critical value to ensure that the light exits without forming stray light with a large viewing angle, the critical value is δ (i.e., δ is a maximum divergence angle of the light reflected at the side wall of the receiving cavity, and generally 20°<δ<60°, and in an implementation, δ may be equivalent to 30°), then θ6<δ, and the designed values of the refractive index n4 of the dispersion medium and the refractive index n1 of the first substrate must satisfy a formula (6).

$$\arcsin\left(\frac{n4}{n1}\right) \geq \frac{\pi}{2} - \delta. \quad (6)$$

Since the surface of the light-transmitting part is the curved surface protrusion 1102a, the light-transmitting part can converge divergent light propagating in the light-transmitting part, so that the brightness of the exited light can be improved, and the peep-proof effect can be ensured.

In an implementation, the light-transmitting part is formed as a convex lens. The convex lens can convert divergent light transmitting through the focal point into collimated light. Collimated light has a higher brightness than divergent light.

In the present disclosure, the specific geometric features of the curved surface protrusion 1102a are not particularly limited. In order to convert as much incident light as possible into collimated light, in an implementation, the focal point O of the convex lens corresponding to the curved surface protrusion 1102a is located on the light incident surface 110b, or as shown in FIG. 4, the focal point O of the convex lens corresponding to the curved surface protrusion 1102a is located outside the light incident surface 110b.

In the present disclosure, specific structures of the first electrode pattern 130 and the second electrode pattern 140 are not particularly limited.

As an alternative implementation, as shown in FIGS. 1 and 3, the first electrode pattern 130 includes a plurality of first electrodes 130a, and each receiving cavity is provided with at least one first electrode 130a.

Since the first electrodes 130 in different receiving cavities are independent of each other, states of exited light at different positions of the peep-proof film can be independently controlled, and therefore various application scenes can be better met.

In the present disclosure, how the first electrodes 130a are disposed in the receiving cavities and at what positions in the receiving cavities are not particularly limited. As an alternative implementation, the first electrode 130a may be disposed on a top surface of the receiving cavity, where the top surface of the receiving cavity is a surface of the receiving cavity facing the light exit surface. As shown in FIG. 4, after the application of voltages to the second electrode pattern 140 and the first electrode 130a is stopped, a gap exists between the barrier wall formed by the electrophoretic particles and the side wall of the receiving cavity, and the gap is filled with the dispersion medium 121, so that it is possible to ensure that incident light satisfying the critical angle is totally reflected at the interface between the film body 110 and the dispersion medium 121, rather than being absorbed by the electrophoretic particles 122.

In the case where the first electrode pattern 130 includes a plurality of first electrodes 130a, the receiving cavities may be provided in two different ways.

Specifically, the film body 110 includes a first substrate 111 and a second substrate 112, the first substrate 111 is attached to the second substrate 112, a surface of the second substrate 112 facing away from the first substrate 111 is the light incident surface 110b, and a surface of the first substrate 111 facing away from the second substrate 112 is the light exit surface 110a.

Figure 8:
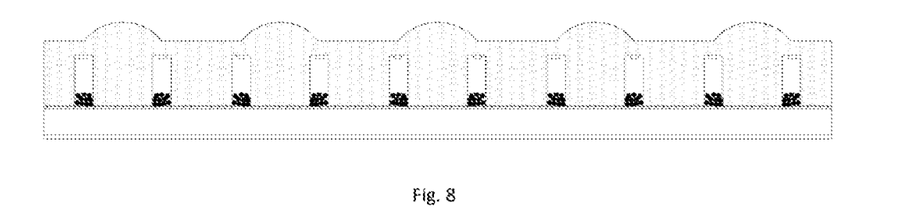
FIG. 8 illustrates a peep-proof film including the structure shown in FIG. 1 according to an embodiment of the present disclosure.

In the implementations shown in FIGS. 1 and 8, the receiving cavity is formed in the first substrate 111. Specifically, when the peep-proof film is manufactured, the receiving cavity having an opening is first formed in the first substrate 111, the first electrode 130 is formed in the receiving cavity, and the electrophoretic liquid is disposed in the receiving cavity by inkjet printing (or other methods), and then the first substrate 111 and the second substrate 112 are disposed together to form the film body, and the opening of the receiving cavity is closed.

Figure 10:
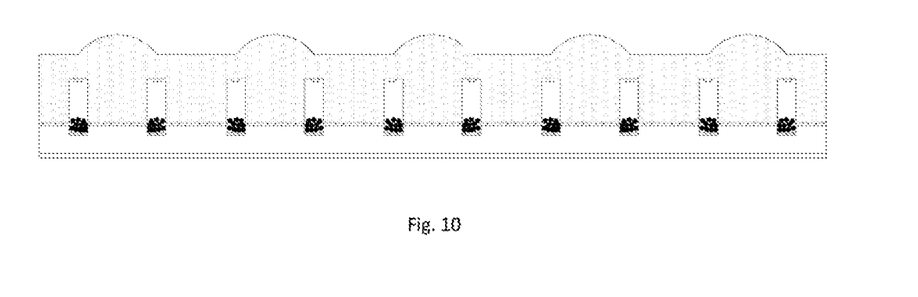
FIG. 10 illustrates a peep-proof film including the structure shown in FIG. 3 according to one embodiment of the present disclosure.

In the implementations shown in FIGS. 3 and 10, the receiving cavity includes a first receiving groove formed in the first substrate 111 and a second receiving groove formed in the second substrate 112. When the peep-proof film is manufactured, the first receiving groove is formed in the first substrate 111, and the second receiving groove is formed in the second substrate 112, respectively, and the electrophoretic liquid is disposed in the first receiving groove and the second receiving groove, so that the first receiving groove and the second receiving groove are joined to form the receiving cavity when the first substrate 111 and the second substrate 112 are attached to each other.

Figure 9:
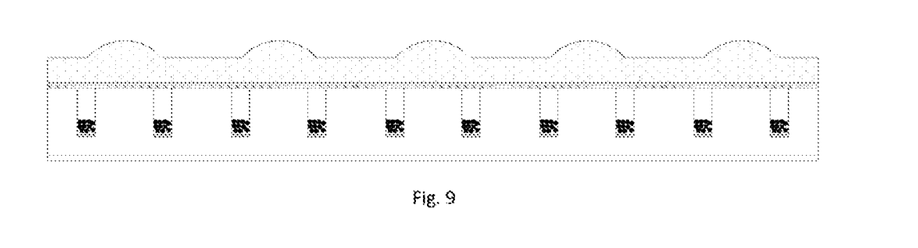
FIG. 9 illustrates a peep-proof film including the structure shown in FIG. 2 according to an embodiment of the present disclosure.

Certainly, the present disclosure is not limited thereto, and in the implementations shown in FIGS. 2 and 9, the first electrode pattern 130 is an plate-shaped electrode, and the first electrode pattern 130 is disposed between the first substrate 111 and the second substrate 112, and the receiving cavity is formed in the second substrate 112. When manufacturing the peep-proof film, a receiving cavity having an opening is first formed in the second substrate 112, the first electrode 130 is formed in the receiving cavity, the electrophoretic liquid is disposed in the receiving cavity by inkjet printing (or other methods), and then the first substrate 111 and the second substrate 112 are disposed together to form the film body, and the opening of the receiving cavity is closed.

In the present disclosure, the refractive index n1 of the first substrate 111 and the refractive index n2 of the second substrate 112 are not particularly limited. However, it is to be noted that the refractive index n4 of the dispersion medium 121 is smaller than the refractive index n1 of the first substrate 111, and the refractive index n4 of the dispersion medium 121 is smaller than the refractive index n2 of the second substrate 112.

In the present disclosure, there is no particular limitation on how to adhere the first substrate 111 to the second substrate 112, and in an implementation, the first substrate 111 and the second substrate 112 are adhered to each other by a transparent adhesive layer 113, and a refractive index n3 of the transparent adhesive layer 113 is the same as the refractive index n1 of the first substrate 111 or the refractive index n2 of the second substrate 112.

Certainly, the present disclosure is not limited thereto, for example, a transparent case having the receiving cavity and the first electrode provided therein may be provided in advance, and the electrophoretic liquid 120 may be enclosed in the transparent case, then a material for forming the film body 110 may be provided, and finally the peep-proof film is obtained.

In the present disclosure, the specific structure of the second electrode pattern 140 is not particularly limited. For example, the second electrode pattern may include a plurality of second electrodes that are independently disposed. For ease of providing, the second electrode pattern 140 is an entire plate-shaped electrode. In order to ensure that the light can be incident normally, the second electrode pattern 140 are made of transparent conductive material, and the second electrode pattern 140 is located on the light incident side of the light incident surface 110b.

To further increase the amount of light exiting the peep-proof film, in an implementation, the peep-proof film further includes at least one reflective layer 150, where a bottom surface of at least one of the receiving cavities is provided with the reflective layer 150. Specifically, the bottom surface of the receiving cavity is a surface of the receiving cavity facing the light incident surface 110b.

When the light irradiates on the reflective layer 150, the light is reflected by the reflective layer 150 and does not further enter the receiving cavity to be absorbed by the electrophoretic particles 122.

It should be noted that the reflective layer 150 not only can improve the brightness of the display device in the peep-proof mode, but also can improve the brightness of the display device in the sharing mode.

As shown in FIG. 4, when the incident light CD irradiates a corresponding position of the bottom of the receiving cavity, the incident light is directly reflected by the reflective layer 150 to the surface of the second electrode pattern 140, instead of being absorbed by the electrophoretic particles 122, and the light reflected back to the second electrode pattern 140 is reflected to the light-transmitting part of the film body by the second electrode pattern 140 and finally exits from the light-transmitting part.

In the present disclosure, the specific material of the reflective layer 150 is not particularly limited. For example, the material of the reflective layer 150 may be high-reflectivity white oil (reflectivity >85%), the reflective layer 150 may also be silver-plated layer (reflectivity >90%), aluminum-plated layer (reflectivity >90%). As another example, the reflective layer 150 may be a non-metallic-plated layer with high reflectivity, such as $SiO_2/TiO_2$ with a reflectivity greater than 95%.

Figure 11:
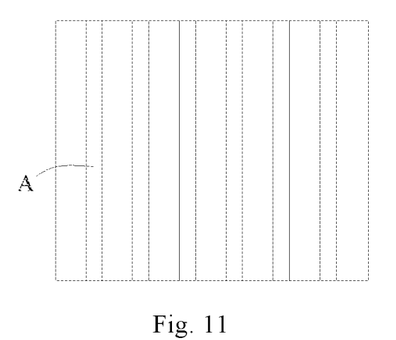
FIG. 11 is a schematic diagram of an arrangement of receiving cavities according to an embodiment of the present disclosure.

In the present disclosure, the arrangement of the receiving cavities is not particularly limited, and if peep-proof is required only in one direction, then a plurality of the receiving cavities A are parallel to each other as shown in FIG. 11.

Figure 12:
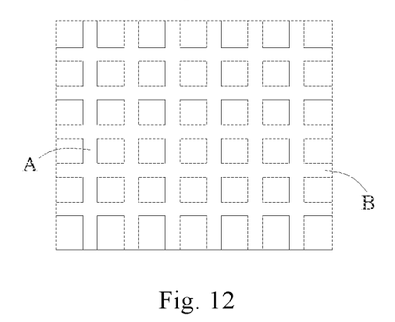
FIG. 12 is a schematic diagram of another arrangement of receiving cavities according to an embodiment of the present disclosure.

If peep-proof is required in two directions, as shown in FIG. 12, the plurality of the receiving cavities are intersected with each other (the transverse receiving cavities B and the longitudinal receiving cavities A are intersected with each other), so that the peep-proof film is divided into a plurality of light-transmitting parts.

Figure 13:
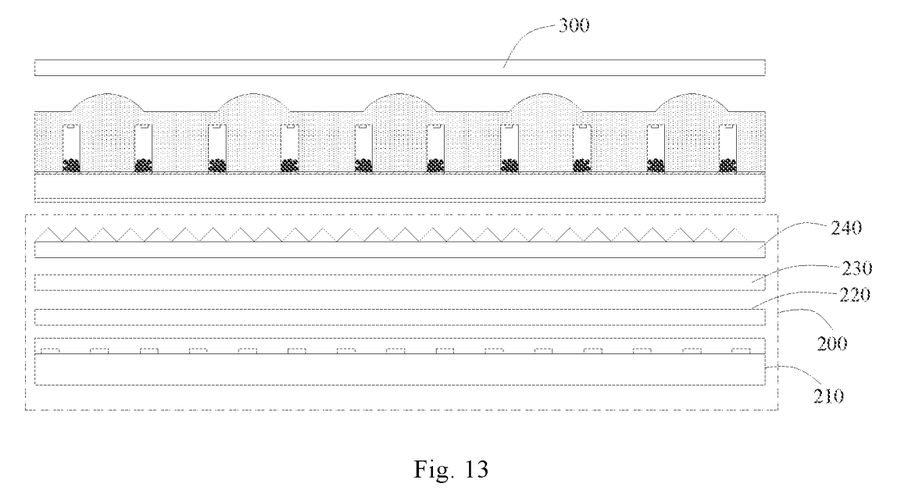
FIG. 13 is a schematic diagram of a backlight source according to an embodiment of the present disclosure.

An embodiment of the present disclosure provides a backlight source, as shown in FIG. 13, the backlight source includes a light emitting panel 200, where the backlight source further includes the above peep-proof film provided by the present disclosure, and the light incident surface 110b of the peep-proof film is disposed opposite to a light emitting surface of the light emitting panel 200.

The backlight source provided by the present disclosure is used in cooperation with a display panel (such as a liquid crystal display panel and an electrochromic display panel) which cannot actively emit light, so that the display panel can display in the peep-proof mode and the sharing mode, and different user requirements can be met.

In the present disclosure, the specific structure of the light emitting panel 200 is not particularly limited. As an alternative implementation, the light emitting panel 200 includes an LED lamp panel 210 and a diffusion plate 220 that are sequentially stacked. The LED lamp panel 210 includes a plurality of LEDs arranged in an array, and the diffusion plate 220 can convert point light sources into a surface light source, so that light emitted from the light emitting panel 220 is more uniform.

As an alternative implementation, the light emitting panel 200 may further include a quantum dot film 230, and in order to make the light emitting panel 200 emit white light, in an implementation, the LED lamp panel emits blue light, and the quantum dot film 230 can emit white light under excitation of the blue light.

In order to improve the brightness of light emitted from the light emitting panel 200, in an implementation, the light emitting panel 200 may further include a prism film 240. Specifically, the LED lamp panel 210, the diffusion plate 220, the quantum dot film 230, and the prism film 240 are sequentially stacked.

As described above, the backlight source may be used in conjunction with a liquid crystal display panel. In order to prevent the light emitted from the backlight source from being absorbed by a lower polarizer of the liquid crystal display panel, in an implementation, the backlight source may further include a reflective polarizer 300 disposed on a light exit side of the peep-proof film. In an implementation, the reflective polarizer 300 may be a DBEF (Dual Brightness Enhance Film).

An embodiment of the present disclosure provides a display device including a display panel and the above-described backlight source provided by the present disclosure.

By applying voltages to the first electrode pattern and the second electrode pattern respectively, the display device can be switched between the sharing mode and the peep-proof mode. Furthermore, since the peep-proof film provided in the present disclosure is adopted, the display device has higher display brightness in the peep-proof mode and the display device has lower power consumption.

In the present disclosure, the specific type of the display panel is not particularly limited. For example, the display panel may be an inactive light emitting display panel such as a liquid crystal display panel, an electrochromic display panel, or the like.

In a case where the display panel is the liquid crystal display panel, the display device further includes a light emitting panel, the peep-proof film is provided between the light emitting panel and a backlight source, the light exit surface of the peep-proof film faces the display panel, and the light incident surface of the peep-proof film faces the backlight source. In other words, in a case where the display panel is the liquid crystal display panel, the display device further includes the backlight source provided by the present disclosure.

In addition, a parameter comparison of the peep-proof film according to the embodiment of the present disclosure and the peep-proof film in the related art will be described below.

Specifically, the parameters of the peep-proof film shown in FIGS. 1 and 8 according to the present disclosure are shown in table 1.

Figure 14:
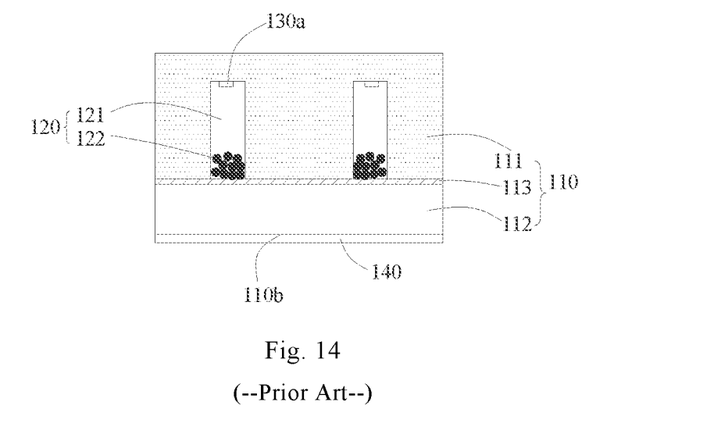
FIG. 14 is a schematic diagram of a portion of a peep-proof film provided by a comparative example in the related art.

FIG. 14 is a schematic diagram showing a structure of a peep-proof film in the related art.

As shown in FIG. 14, the peep-proof film includes a first substrate 111 (which has a refractive index n1) and a second substrate 112 (which has a refractive index n2), the first substrate 111 and the second substrate 112 are adhered together by an adhesive layer 113 (which has a refractive index n3), receiving cavities are formed in the first substrate 111, and an electrophoretic liquid 120 (including a dispersion medium 121 and electrophoretic particles 122, the refractive index of the dispersion medium being n4) is disposed in the receiving cavities. The parameters of the peep-proof film in the related art are also shown in table 1.

TABLE 1

| model | h1/ μm | h2/ μm | h3/ μm | d1/ μm | d2/ μm | n1 | n2 | n3 | n4 | reflective layer | curved surface |
|---|---|---|---|---|---|---|---|---|---|---|---|
| the peep-proof film in the related art (comparative exmple) | 130 | 30 | 150 | 80 | 20 | 1.582 | 1.582 | 1.582 | 1.582 | none | none |
| the peep-proof film of the present disclosure (an example) | 130 | 30 | 150 | 80 | 20 | 1.582 | 1.582 | 1.582 | 1.48 | has/ reflectivity is 90% | has |

Figure 17:
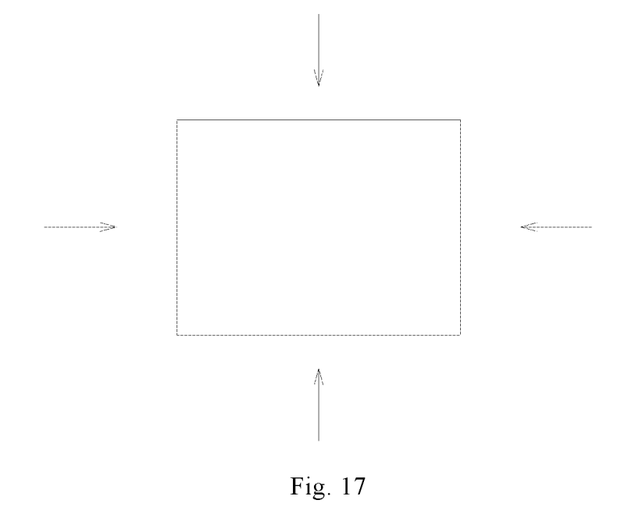
FIG. 17 illustrates a schematic diagram of simulation observation directions for observing the peep-proof film.

A simulation of viewing from left and right sides of the peep-proof film and a simulation of viewing from up and low sides of the peep-proof film were performed by Light-tools, and the angular luminance charts in the peep-proof mode of the two peep-proof films in the comparative example of the related art and the example of the present disclosure were obtained, respectively. Here, "up and down" and "left and right" refer to directions based on FIG. 17.

Figure 15:
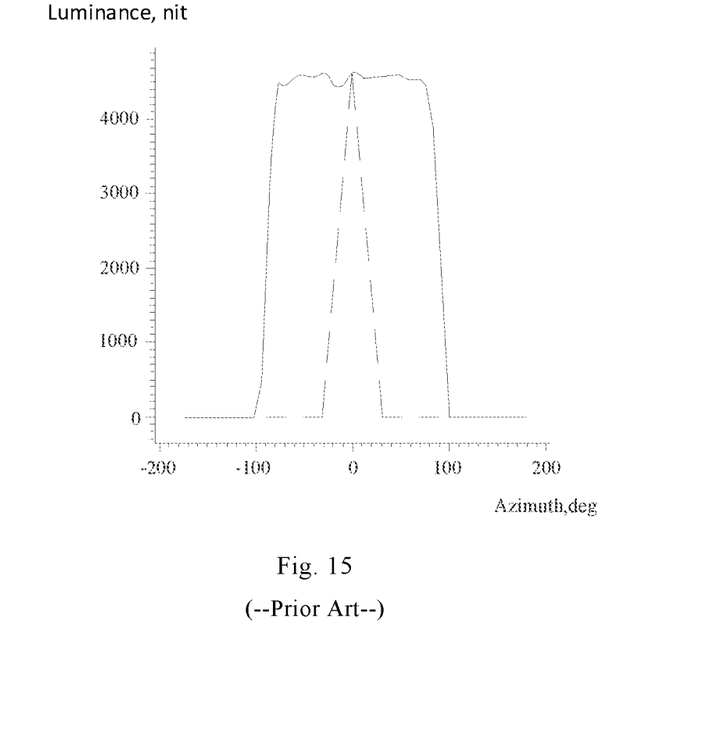
FIG. 15 is an angular luminance graph in a peep-proof mode of a peep-proof film provided by a comparative example in the related art.

As shown in FIG. 15, in the simulation result of the comparative example of the related art, a central angular luminance is 4600 nit, a half-luminance angle is ±15°, and a cut-off angle is ±30°. In FIG. 15, the solid-line curve shows a luminance curve obtained by simulating viewing from the up and low sides of the peep-proof film, and the dotted-line curve shows a luminance curve obtained by simulating viewing from the left and right sides of the peep-proof film.

Figure 16:
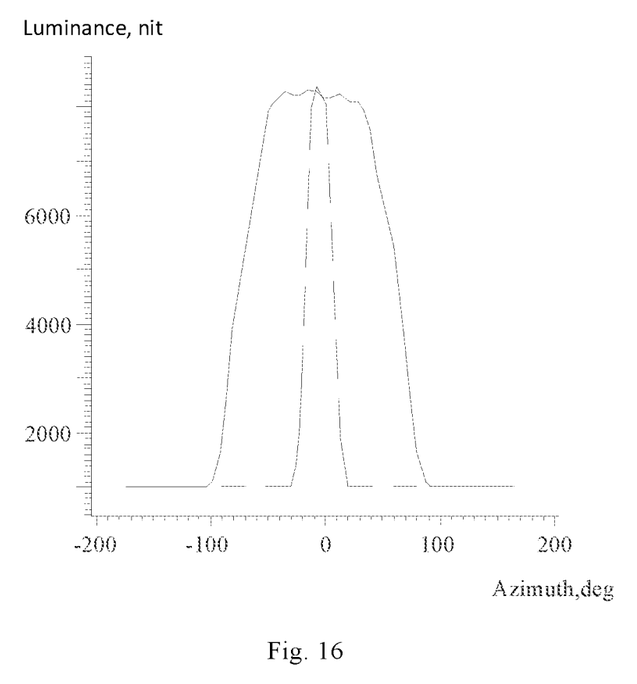
FIG. 16 is an angular luminance graph in a peep-proof mode of a peep-proof film provided according to an embodiment of the present disclosure.

As shown in FIG. 16, in the simulation result of the example of the present disclosure, a center angular luminance is 7500 nit, a half-luminance angle is ±12°, and a cut-off angle is ±26°. In FIG. 16, the solid-line curve shows a luminance curve obtained by simulating viewing from the up and low sides of the peep-proof film, and the dotted-line curve shows a luminance curve obtained by simulating viewing from the left and right sides of the peep-proof film.

It can be seen from above that, under the conditions that the spaces between the receiving cavities are the same, the thicknesses of the peep-proof films are the same, and the materials are the same between the peep-proof films in the comparative example of the related art and the example of the present disclosure, due to addition of the reflective layer and provision of the curved surface protrusion, the brightness of the peep-proof film provided by the example of the present disclosure is improved by 63% compared with that of the peep-proof film in the comparative example of the related art, the half-luminance angles of the left side and the right side are reduced by 3°, respectively, and the cut-off angles of the left side and the right side are reduced by 4°, respectively.

By simulating the illuminance chart of the peep-proof film provided in the comparative example of the related art, it can be seen that an average value of the illuminance is 4340 lux, and an illuminance uniformity is 85%.

By simulating the illuminance chart of the peep-proof film provided in the example of the present disclosure, it can be seen that an average value of the illuminance is 5750 lux, and an illuminance uniformity is 88.9%.

Therefore, the brightness of the peep-proof film provided by the example of the present disclosure is improved by 32%, and the illumination uniformity is improved by 3.9%.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

The invention claimed is:

1. A peep-proof film, comprising: a light-transmitting film body, an electrophoretic liquid, a first electrode pattern and a second electrode pattern, the film body comprises a light incident surface and a light exit surface which are opposite to each other, the first electrode pattern and the second electrode pattern are spaced in a thickness direction of the peep-proof film, the film body has a plurality of receiving cavities thereinside, the electrophoretic liquid is in the receiving cavities, the electrophoretic liquid is located between the first electrode pattern and the second electrode pattern, and comprises a dispersion medium and electrophoretic particles, and a refractive index of the dispersion medium is less than that of the film body, wherein
the light exit surface of the film body comprises a plurality of planar connecting portions and a plurality of curved surface protrusions, each curved surface protrusion is located between two adjacent receiving cavities, and adjacent curved surface protrusions are connected by the planar connecting portion.

2. The peep-proof film of claim 1, wherein dimensions of the peep-proof film satisfy a following relationship:

$$\arctan\left(\frac{d1}{2h1}\right) \le \sigma,$$

where d1 is a distance between opposite side surfaces of two adjacent receiving cavities;
h1 is a distance between a top surface of the receiving cavity and the light incident surface;
σ is a maximum divergence angle of light irradiated on the curved surface protrusions from the light incident side of the peep-proof film.

3. The peep-proof film of claim 1, wherein a refractive index of the dispersion medium and the refractive index of the film body satisfy a following relationship:

$$\arcsin\left(\frac{n4}{n1}\right) \geq \frac{\pi}{2} - \delta,$$

where n4 is the refractive index of the dispersion medium; n1 is the refractive index of the film body; δ is the maximum divergence angle of light reflected at a side wall of the receiving cavity.

4. The peep-proof film of claim 1, wherein the film body comprises a first substrate and a second substrate, the first substrate and the second substrate are attached together, a surface of the second substrate facing away from the first substrate is the light incident surface, and a surface of the first substrate facing away from the second substrate is the light exit surface.

5. The peep-proof film of claim 4, wherein the first electrode pattern comprises a plurality of first electrodes, and each receiving cavity is provided at least one of the first electrodes therein.

6. The peep-proof film of claim 5, wherein the first electrode is disposed on a top surface of the receiving cavity with a space between each edge of the first electrode and a side wall of the receiving cavity adjacent to the edge, wherein the top surface of the receiving cavity is a surface of the receiving cavity facing the light exit surface.

7. The peep-proof film of claim 5, wherein the receiving cavity is formed in the first substrate.

8. The peep-proof film of claim 5, wherein the receiving cavity comprises a first receiving groove formed in the first substrate and a second receiving groove formed in the second substrate.

9. The peep-proof film of claim 1, wherein the first electrode pattern is an entire plate-shaped electrode, the first electrode pattern is located between the first substrate and the second substrate, and the receiving cavities are formed in the second substrate.

10. The peep-proof film of claim 1, wherein the second electrode pattern is an entire plate-shaped electrode and is made of a transparent conductive material, and the second electrode pattern is located on a light incident side of the light incident surface.

11. The peep-proof film of claim 1, further comprising at least one reflective layer, wherein the reflective layer is disposed on a bottom surface of at least one of the receiving cavities, and wherein the bottom surface of the receiving cavity is a surface of the receiving cavity facing the light incident surface.

12. The peep-proof film of claim 2, further comprising at least one reflective layer, wherein the reflective layer is disposed on a bottom surface of at least one of the receiving cavities, and wherein the bottom surface of the receiving cavity is a surface of the receiving cavity facing the light incident surface.

13. The peep-proof film of claim 3, further comprising at least one reflective layer, wherein the reflective layer is disposed on a bottom surface of at least one of the receiving cavities, and wherein the bottom surface of the receiving cavity is a surface of the receiving cavity facing the light incident surface.

14. The peep-proof film of claim 1, wherein the receiving cavities are parallel to each other and spaced apart from each other.

15. The peep-proof film of claim 1, wherein the receiving cavities are intersected with each other to divide the peep-proof film into a plurality of light transmitting parts.

16. A backlight source, comprising a light emitting panel, wherein the backlight source further comprises the peep-proof film of claim 1, and the light incident surface of the peep-proof film is opposite to a light emitting surface of the light emitting panel.

17. The backlight source of claim 16, further comprising a reflective polarizer located on a light exit side of the peep-proof film.

18. A display device, comprising a display panel and a backlight source, wherein the backlight source is the backlight source of claim 12 and located on a backlight side of the display device.

\* \* \* \* \*